(12) United States Patent
Kato (10) Patent No.: US 12,321,148 B2
(45) Date of Patent: Jun. 3, 2025

(54) MOVEMENT PATH DRAWING DEVICE

(71) Applicant: FANUC CORPORATION, Yamanashi (JP)

(72) Inventor: Tomokazu Kato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 386 days.

(21) Appl. No.: 17/758,462

(22) PCT Filed: Jan. 5, 2021

(86) PCT No.: PCT/JP2021/000079
§ 371 (c)(1),
(2) Date: Jul. 7, 2022

(87) PCT Pub. No.: WO2021/141019
PCT Pub. Date: Jul. 15, 2021

(65) Prior Publication Data
US 2023/0034051 A1    Feb. 2, 2023

(30) Foreign Application Priority Data
Jan. 10, 2020    (JP) .................................. 2020-003026

(51) Int. Cl.
G05B 19/4069    (2006.01)

(52) U.S. Cl.
CPC ............... *G05B 19/4069* (2013.01); *G05B 2219/40629* (2013.01)

(58) Field of Classification Search
None
See application file for complete search history.

(56) References Cited

U.S. PATENT DOCUMENTS

| 4,821,201 | A | 4/1989 | Kawamura et al. |
| 10,551,820 | B2 * | 2/2020 | Bonay .............. G05B 19/41885 |
| 2005/0071802 | A1 | 3/2005 | Brakelmann et al. |
| 2007/0100493 | A1 | 5/2007 | Fujibayashi et al. |
| 2014/0200706 | A1 * | 7/2014 | Pruschek ............. G05B 19/182 700/159 |

(Continued)

FOREIGN PATENT DOCUMENTS

| CN | 105807717 A | 7/2016 |
| CN | 110174874 A | 8/2019 |

(Continued)

*Primary Examiner* — Ariel Mercado-Vargas
(74) *Attorney, Agent, or Firm* — HAUPTMAN HAM, LLP (57) ABSTRACT

A movement path drawing device includes an execution time storage unit that stores execution times of respective blocks of control programs, a program analysis unit that creates movement command data by analyzing the control programs, a movement path creation unit that creates the movement paths of the movable parts on the basis of the created movement command data, a drawing execution control unit that performs drawing execution control for drawing movement paths indicating a positional relationship between the movable parts of the plurality of systems of the machine at a predetermined time on the basis of the execution times of the respective blocks and the movement paths of the movable parts, created by the movement path creation unit, and a drawing unit that executes drawing processing for drawing the movable parts of the plurality of systems.

3 Claims, 7 Drawing Sheets

(56) References Cited

U.S. PATENT DOCUMENTS

| | | | |
|---|---|---|---|
| 2014/0362387 A1* | 12/2014 | Yamamoto | B23Q 17/2428 |
| | | | 356/614 |
| 2015/0251315 A1* | 9/2015 | Brandenberger | G05B 19/4061 |
| | | | 901/14 |
| 2015/0268661 A1* | 9/2015 | Ogawa | G05B 19/4061 |
| | | | 700/182 |
| 2016/0209825 A1 | 7/2016 | Murakawa | |
| 2017/0205804 A1 | 7/2017 | Kuroki | |
| 2018/0150056 A1* | 5/2018 | Bonay | G05B 19/41885 |
| 2019/0258215 A1 | 8/2019 | Igarashi et al. | |

FOREIGN PATENT DOCUMENTS

| | | |
|---|---|---|
| JP | S62136340 A | 6/1987 |
| JP | H10264058 A | 10/1998 |
| JP | 2003103491 A | 4/2003 |
| JP | 2005108185 A | 4/2005 |
| JP | 2007122461 A | 5/2007 |
| JP | 2017126199 A | 7/2017 |

* cited by examiner

PREDICTED EXECUTION TIMES OF BLOCKS OF EACH SYSTEM

PROGRAM O1000 OF SYSTEM 1

| SEQUENCE NUMBER | COMMAND | (PREDICTED) EXECUTION TIME |
|---|---|---|
| N100 | G00 X*** | 0.5 SECONDS |
| N101 | G00 Z** | 0.5 SECONDS |
| N102 | G01 X** | 2.0 SECONDS |
| N103 | G00 Z** | 0.5 SECONDS |
| N104 | G00 X** | 1.0 SECONDS |
| N105 | G00 Z** | 0.5 SECONDS |
| ... | ... | ... |

PROGRAM O2000 OF SYSTEM 2

| SEQUENCE NUMBER | COMMAND | (PREDICTED) EXECUTION TIME |
|---|---|---|
| N200 | G00 X*** | 0.5 SECONDS |
| N201 | G00 Z** | 0.5 SECONDS |
| N202 | G01 Z** | 1.0 SECONDS |
| N203 | G00 X** | 0.5 SECONDS |
| N204 | G01 Z** | 1.5 SECONDS |
| N205 | G00 X** | 1.0 SECONDS |
| ... | ... | ... |

PROGRAM O1000 OF SYSTEM 1

| SEQUENCE NUMBER | COMMAND |
|---|---|
| N100 | G00 X** |
| N101 | G00 Z** |
| N102 | G01 X** |
| N103 | G00 Z** |
| N104 | G00 X** |
| N105 | G00 Z** |
| ... | ... |

PROGRAM O2000 OF SYSTEM 2

| SEQUENCE NUMBER | COMMAND |
|---|---|
| N200 | G00 X** |
| N201 | G00 Z** |
| N202 | G01 X** |
| N203 | G00 X** |
| N204 | G01 Z** |
| N205 | G00 X** |
| ... | ... |

| SYSTEM 1 | N100 | N101 | N102 | N103 | N104 | N105 | ... |
| SYSTEM 2 | N200 | N201 | N202 | N203 | N204 | N205 | ... |

PROCESSING TIMES FOR PROCESSING BLOCKS IN CONTROLLER

| SYSTEM 1 | N100 | N101 | N102 | N103 | N104 | N105 | ... |
| SYSTEM 2 | N200 | N201 | N202 | N203 | N204 | N205 | ... |

PROCESSING TIMES FOR PROCESSING BLOCKS WITH PROCESSING SIMULATOR

FIG. 7

MOVEMENT PATH DRAWING DEVICE

RELATED APPLICATIONS

The present application is a National Phase of International Application No. PCT/JP2021/000079 filed Jan. 5, 2021, which claims priority to Japanese Application No. 2020-003026, filed Jan. 10, 2020.

TECHNICAL FIELD

The present invention relates to a movement path drawing device, and more particularly to a movement path drawing device for drawing the movement paths of a plurality of drive units.

BACKGROUND ART

Figure 5:
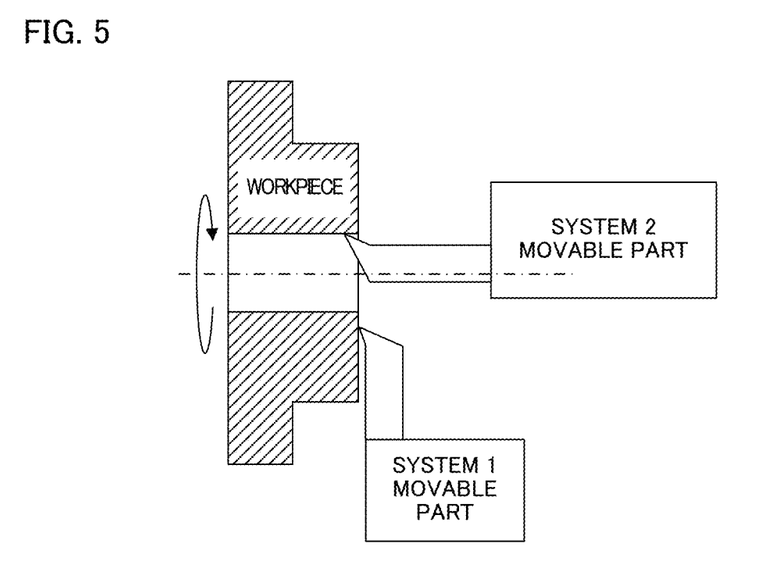
FIG. 5 is a view showing an example in which a workpiece is processed by attaching tools respectively to movable parts of two systems.

A controller for controlling an industrial machine such as a machine tool may control a plurality of systems simultaneously in order to process a single workpiece (PTL 1 and so on, for example). FIG. 5 shows an example in which tools are respectively attached to a movable part of system 1 and a movable part of system 2 on a lathe in order to process a single workpiece simultaneously. In such a case, control programs are prepared respectively in order to control the plurality of systems. The controller coordinates the operations of the movable parts of the respective systems by coordinating control operations realized by the plurality of control programs.

When checking the control programs of the plurality of systems for errors, it can be performed by, for example, simulating the control operations realized by the control programs of the respective systems using an offline control simulator. Meanwhile, the controller has a manual handle retrace function for slowly moving the movable parts of the respective systems along movement paths instructed by the control programs in accordance with a rotation amount of a manual handle rotated by an operator while executing the control programs, and a machine-locked operation function for performing an operation in a state where the movement of axes of the control subject machines is suppressed. Hence, by checking the operations of the control programs using these functions of the controller, the control operations realized by the control programs of the respective systems can be checked without making actual processing of the workpiece.

CITATION LIST

Patent Literature

[PTL 1] Japanese Patent Laid-Open No. 2007-122461

SUMMARY OF INVENTION

Technical Problem

The control simulator creates movement paths for a cutter stand and a spindle head serving as the movable parts of the control subject machine by interpreting blocks of the control programs. The movable parts are then drawn in an end position of the blocks while drawing the created movement paths of the movable parts and the shape of the processed workpiece. The control simulator repeats this series of processing for all blocks of the control programs.

Figure 6:
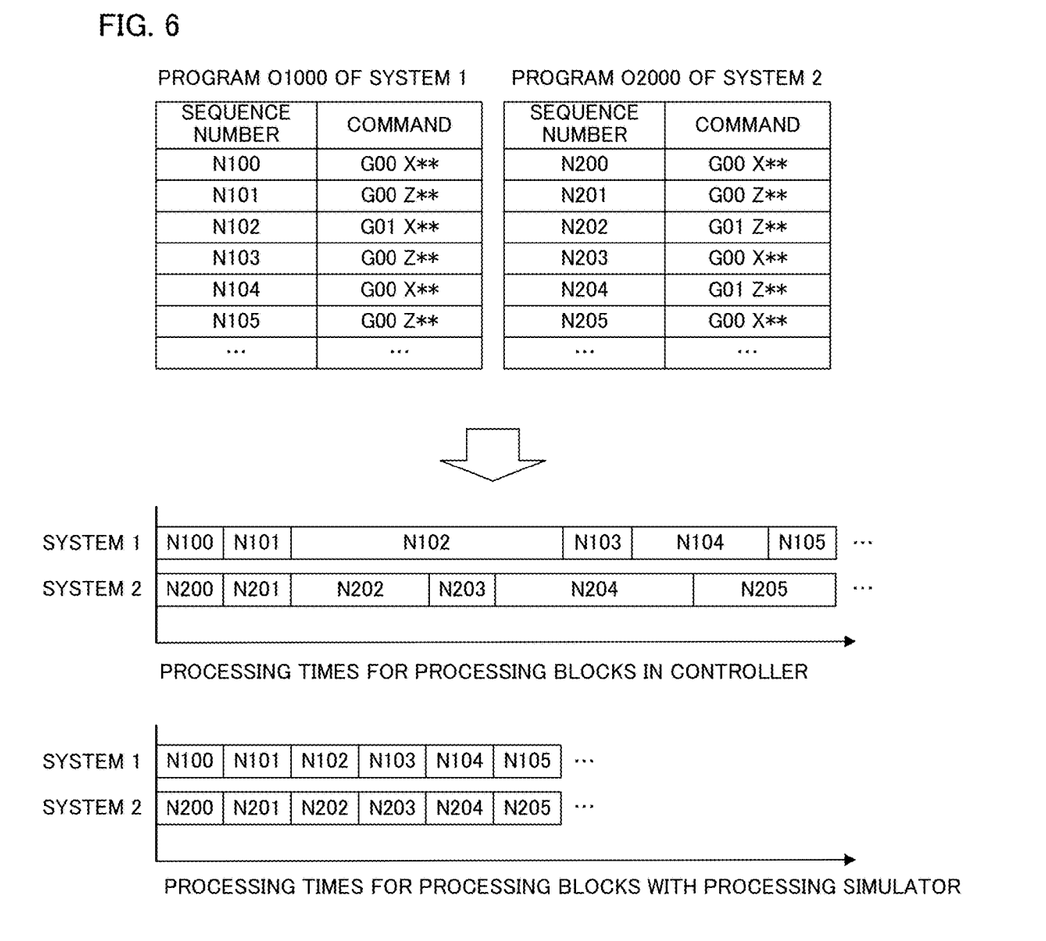
FIG. 6 is a view showing execution times respectively in a case where control programs are executed and a case where a control simulation according to the prior art is performed.

When performing the processing described above, the control simulator does not take into account the execution time that the processing is generally expected to take in each block during actual operation control. For example, a simulation of control programs for processing a workpiece using tools attached to movable parts of two systems, as shown in FIG. 5, will now be considered. FIG. 6 is a view showing processing times in a case where a control program for controlling system 1 and a control program for controlling system 2 are executed by the controller, and a case where a control simulation is performed. As shown in FIG. 6, when the control program of system 1 and the control program of system 2 are respectively executed by the controller, the processing times of the respective blocks differ according to the command type and command content. However, when a control simulation is performed by a control simulator, the processing times of the respective blocks are basically identical. Therefore, the control simulator cannot accurately represent the positional relationship between the movable parts of the plurality of systems at each point in time.

Figure 7:
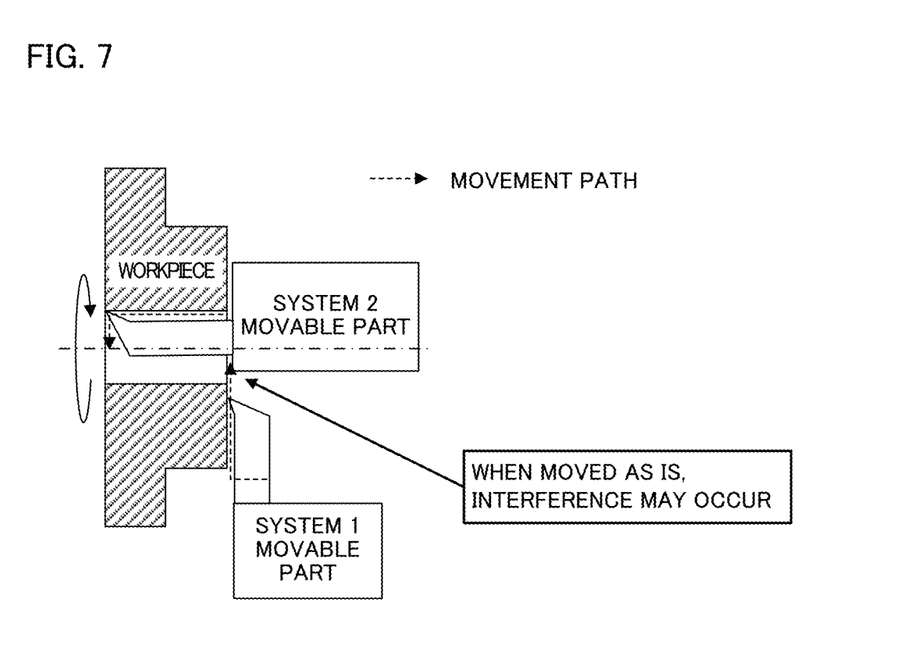
FIG. 7 is a view showing an example in which movable parts of two systems interfere.

As a result, when the control simulator is used, it is impossible to accurately check whether or not the movable parts of the respective systems will interfere with each other. As shown in FIG. 7, when the movable part of system 1 moves to the position of the movable part of system 2, the tool of system 1 may interfere with the movable part of system 2. However, the control simulator cannot determine whether or not the movable part of system 2 is in the position shown in the figure at the point in time when system 1 moves along the movement path shown in FIG. 7. Hence, it is difficult to check whether or not interference will actually occur. Similarly, the control simulator cannot accurately check whether the order of the control operations is correct between the systems.

Here, when an interference check is performed in advance, the positional relationship between the tools of the respective systems can be checked in the controller by drawing the movement paths of the movable parts using the manual handle retrace function and the machine-locked operation function. With the manual handle retrace function, however, it is necessary to execute each block of the control programs in sequence while checking the positions of the movable parts, and therefore a problem occurs in that the interference check takes time. Likewise with respect to the machine-locked operation function, at least the amount of time it takes to actually execute the control programs is required, and therefore a problem occurs in that the amount of time required for the check is longer than when the operation is checked using the control simulator. Furthermore, even when one of the aforesaid functions is used, another problem occurs in that the controller and the machine serving as the control subject are occupied while the check is underway, and therefore the machine cannot be used during this time, leading to a reduction in the availability of the machine.

Hence, there is demand for a technique allowing a simulator that draws movement paths of the movable parts of a machine to perform drawing while taking into account the time taken by a control program to execute a control operation.

Solution to Problem

One aspect of the present invention is a movement path drawing device drawing movement paths of movable parts of a plurality of systems of a machine, the systems being controlled on the basis of control programs for respectively controlling the systems, the movement path drawing device including an execution time storage unit that stores execution times for respective blocks of the control programs, a program analysis unit that creates movement command data by analyzing the control programs, a movement path creation unit that creates the movement paths of the movable parts on the basis of the movement command data, a drawing execution control unit that performs drawing execution control for drawing movement paths indicating a positional relationship between the movable parts of the plurality of systems at a predetermined time on the basis of the execution times of the respective blocks of the control programs, stored in the execution time storage unit, and the movement paths of the movable parts, created by the movement path creation unit, and a drawing unit that executes drawing processing for drawing the movable parts of the plurality of systems in accordance with the control executed by the drawing execution control unit.

Advantageous Effects of Invention

According to this aspect of the present invention, it is possible to ascertain the operations of the movable parts of the plurality of systems of the machine and the positional relationship between the movable parts of the respective systems in chronological order. As a result, it possible to check offline, prior to the actual processing, whether the movable parts of the respective systems will interfere with each other and whether the processing order is correct between the systems. Hence, the need to use a controller and the machine for these checks is eliminated, and therefore the next program can be checked and corrected while processing by the machine is underway. As a result, an improvement in the availability of the machine can be expected.

DESCRIPTION OF EMBODIMENTS

Embodiments of the present invention will be described below together with the figures.

Figure 1:
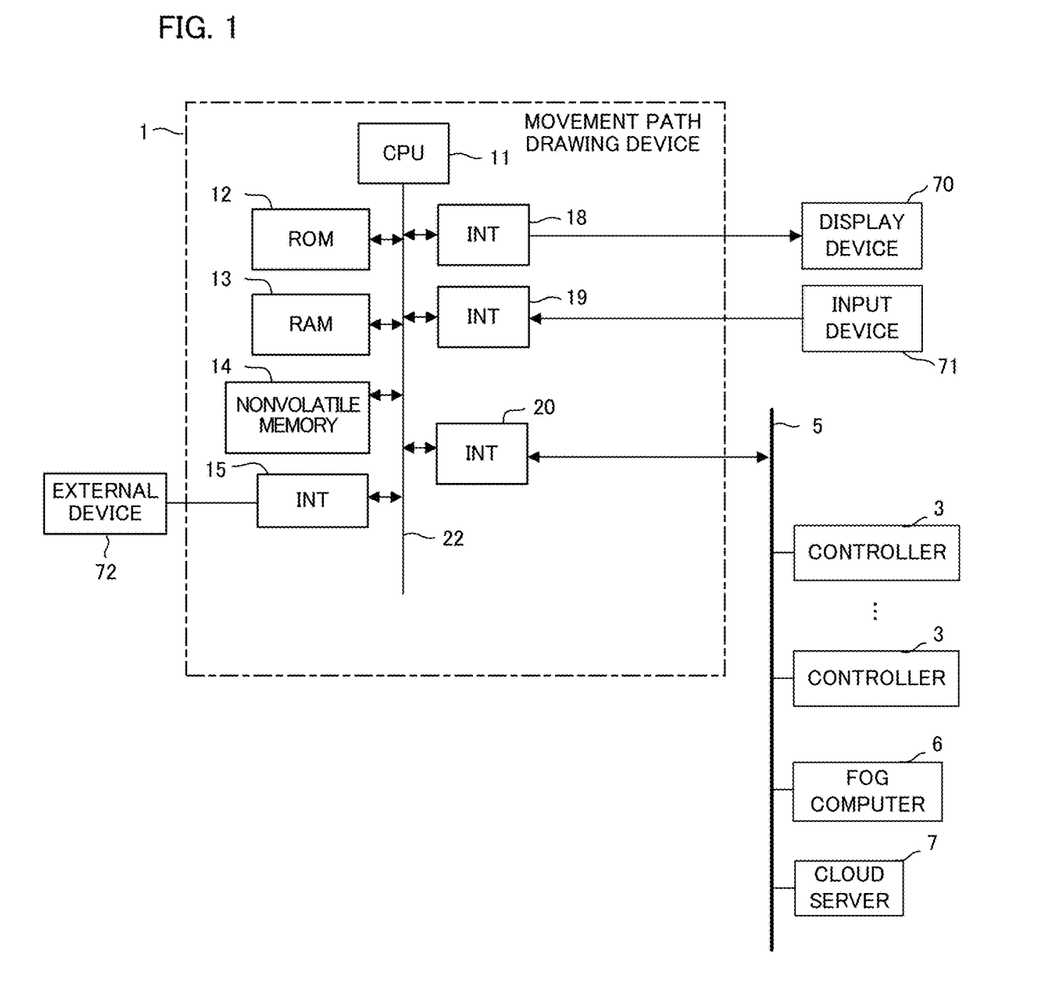
FIG. 1 is a schematic hardware configuration diagram of a movement path drawing device according to an embodiment.

FIG. 1 is a schematic hardware configuration diagram showing main parts of a movement path drawing device according to an embodiment of the present invention. A movement path drawing device 1 of the present invention can be packaged as a controller for controlling an industrial machine, for example. The movement path drawing device 1 of the present invention can also be packaged on a personal computer annexed to a controller for controlling an industrial machine or a person computer, a fog computer, or a cloud server connected to the controller by a wired/wireless network. In this embodiment, an example in which the movement path drawing device 1 is packaged on a personal computer that is connected by a network to a controller for controlling an industrial machine will be described.

A CPU 11 included in the movement path drawing device 1 according to this embodiment is a processor for performing overall control of the movement path drawing device 1. The CPU 11 reads a system program stored in a ROM 12 via a bus 22, and performs overall control of the movement path drawing device 1 in accordance with the system program. Temporary calculation data and display data, various data input from the outside, and so on are temporarily stored in a RAM 13.

A nonvolatile memory 14 is constituted by a memory that is backed up by a battery, not shown in the figure, an SSD (Solid State Drive), or the like, for example, and the storage state thereof is maintained even when a power supply of the movement path drawing device 1 is switched off. The nonvolatile memory 14 stores data and control programs read from an external device 72 via an interface 15, data and control programs input via an input device 71, data acquired from a controller 3 for controlling the machine or another computer such as a fog computer 6 or a cloud server 7, and so on. The data and control programs stored in the nonvolatile memory 14 may be expanded to the RAM 13 at the time of execution/use. Further, various system programs such as a well-known analysis program are written in advance to the ROM 12.

The interface 15 is an interface for connecting the CPU 11 of the movement path drawing device 1 to the external device 72, such as a USB device. Control programs, parameters, and so on used to control the industrial machine, for example, can be read from the external device 72 side. Further, control programs, parameters, and so on that are edited in the movement path drawing device 1 may be stored in external storage means via the external device 72 or transmitted to the controller 3 or the other computer via an interface 20 and a network 5.

Data read to the memory, data acquired as a result of executing the control programs, system program, and so on are output to a display device 70 via an interface 18 and displayed thereon. Further, the input device 71, which is constituted by a keyboard, a pointing device, or the like, transfers commands, data, and so on based on operations performed by an operator via an interface 19 to the CPU 11.

The interface 20 is an interface for connecting the CPU of the movement path drawing device 1 to the wired or wireless network 5. The controller 3 for controlling the industrial machine or the fog computer 6, the cloud server 7, or the like are connected to the network 5 in order to exchange data with the movement path drawing device 1.

Figure 2:
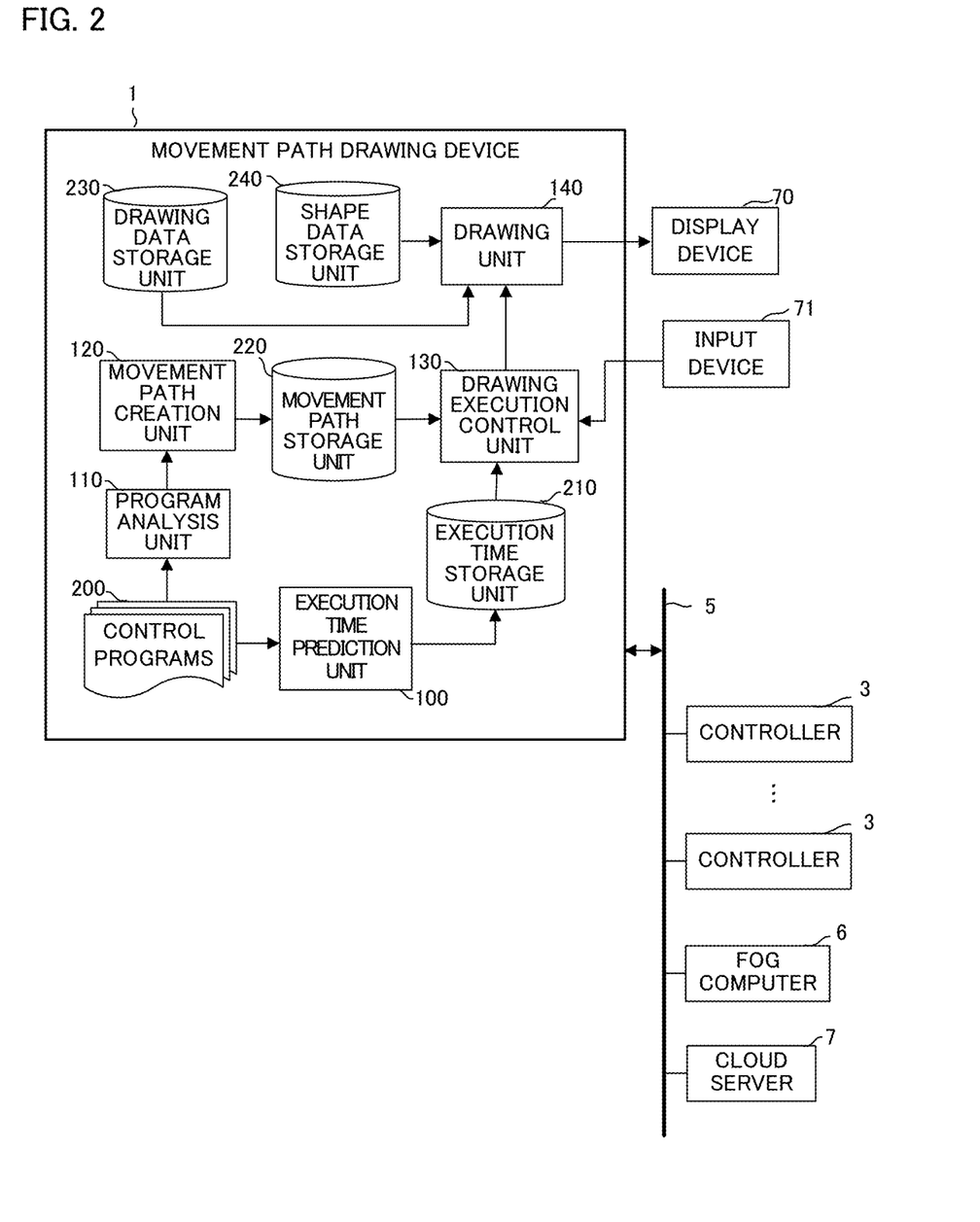
FIG. 2 is a schematic function block diagram of a movement path drawing device according to a first embodiment.

FIG. 2 is a schematic block diagram showing functions included in the movement path drawing device 1 according to a first embodiment of the present invention. The functions included in the movement path drawing device 1 according to this embodiment are realized by having the CPU 11 included in the movement path drawing device 1 shown in FIG. 1 execute the system program so as to control the operations of respective parts of the movement path drawing device 1.

The movement path drawing device 1 of this embodiment includes an execution time prediction unit 100, a program analysis unit 110, a movement path creation unit 120, a drawing execution control unit 130, and a drawing unit 140. Further, a plurality of control programs 200 for controlling respective systems, the control programs 200 being acquired from the input device 71, the external device 72, or the like, are stored in advance in the RAM 13 and/or the nonvolatile memory 14 of the movement path drawing device 1. Furthermore, an execution time storage unit 210 for storing predicted execution times of blocks of the control programs 200, a movement path storage unit 220 for storing movement paths corresponding to commands issued in relation to the blocks of the control programs 200, a drawing data storage unit 230 storing drawing data for displaying a simulation result screen, and a shape data storage unit 240 for storing shape data relating to movable parts of the respective systems are prepared in advance in the RAM 13 and/or the nonvolatile memory 14 of the movement path drawing device 1.

The execution time prediction unit 100 is realized by having the CPU 11 of the movement path drawing device 1 shown in FIG. 1 execute the system program read from the ROM 12 so that calculation processing is performed by the CPU 11 mainly using the RAM 13 and the nonvolatile memory 14. The execution time prediction unit 100 predicts an execution time for each block of the control programs 200 and stores the prediction results in the execution time storage unit 210. The execution time prediction unit 100 predicts the time taken to execute a command in each block of the control programs 200 using a well-known technique relating to processing time prediction, such as that of Japanese Patent No. 4980458 or Japanese Patent No. 6050634, for example. The execution times of the blocks, predicted by the execution time prediction unit 100, are stored in the execution time storage unit 210 in association with the respective blocks of the control programs.

The program analysis unit 110 is realized by having the CPU 11 of the movement path drawing device 1 shown in FIG. 1 execute the system program read from the ROM 12 so that calculation processing is performed by the CPU 11 mainly using the RAM 13 and the nonvolatile memory 14. The program analysis unit 110 reads and analyzes the blocks of the respective control programs 200 and creates movement command data for the movable parts of the systems controlled respectively by the control programs 200. The program analysis unit 110 creates movement command data for each block in relation to an axis along which the movable part moves on the basis of feed commands commanded in accordance with the blocks of the control programs 200, offset values based on correction commands and parameters, and so on. The movement command data created by the program analysis unit 110 are output to the movement path creation unit 120.

The movement path creation unit 120 is realized by having the CPU 11 of the movement path drawing device 1 shown in FIG. 1 execute the system program read from the ROM 12 so that calculation processing is performed by the CPU 11 mainly using the RAM 13 and the nonvolatile memory 14. The movement path creation unit 120 creates movement path-related data for each block of the control programs 200 in relation to the movable parts of the respective systems on the basis of the movement command data created by the program analysis unit 110. The movement path-related data are data indicating a movement path for a predetermined position on the movable part (a cutting edge of the tool included in the movable part, or the like, for example). The movement path-related data may also be vector data in a predetermined coordinate system (a machine coordinate system of the industrial machine serving as the control subject, or the like, for example). The movement path-related data created by the movement path creation unit 120 are stored in the movement path storage unit 220.

The drawing execution control unit 130 is realized by having the CPU 11 of the movement path drawing device 1 shown in FIG. 1 execute the system program read from the ROM 12 so that calculation processing is performed by the CPU 11 mainly using the RAM 13 and the nonvolatile memory 14 and input processing is performed using the interface 19. The drawing execution control unit 130 performs control to simulate (draw) the manner in which the movable parts of the respective systems move in synchronization along the movement paths created by the movement path creation unit 120 on the basis of the predicted execution times predicted by the execution time prediction unit 100.

The drawing execution control unit 130 may also command the drawing unit 140 to draw the movement paths continuously while taking an amount of time corresponding to the predicted execution time of each block of the control programs 200 of the respective systems, for example. In this case, the drawing execution control unit 130 causes the drawing unit 140 to draw the movement paths of the respective movable parts by issuing a command to the drawing unit 140 indicating the movement paths of the movable parts of the respective systems and the movement times (the predicted execution times) thereof. At this time, the drawing unit 140 converts the commanded movement paths into vectors in a drawing space and draws the movement paths so that the movable parts move along the vectors while taking the predicted execution times. The elapse of the movement time is advanced in accordance with the elapse of time on an RTC (Real Time Clock), not shown in the figures, provided in the movement path drawing device 1, for example. At this time, it may be made possible to implement an override for setting the speed at which time elapses at a predetermined multiplying factor on the basis of an operator command from the input device 71. For example, when the operator sets the multiplying factor of the speed at which time elapses at a multiple of 10, the drawing unit 140 draws the manner in which the movable parts of the respective systems move on the display device 70 at a speed 10 times faster than when the control programs 200 are executed normally.

Figure 3:
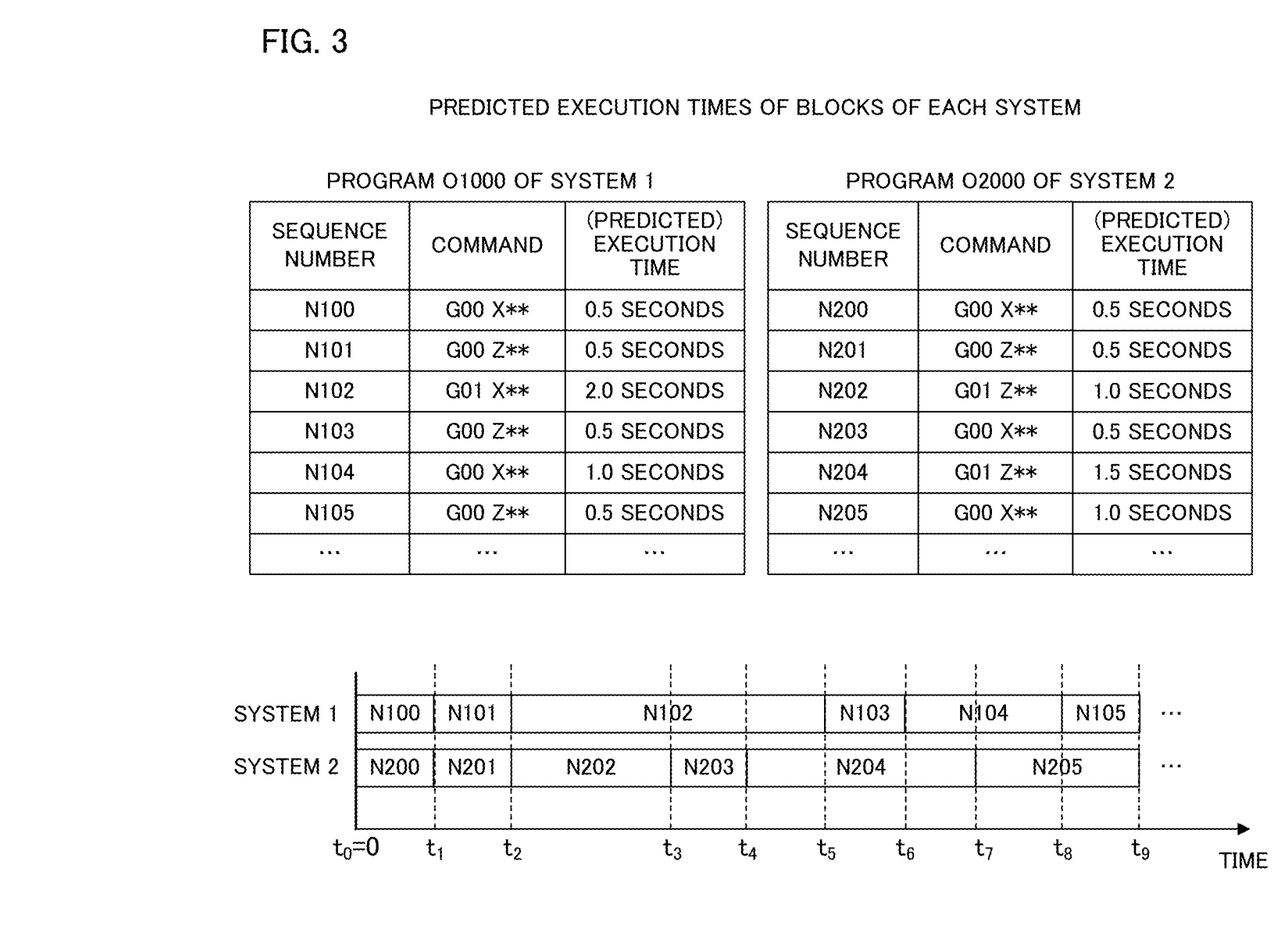
FIG. 3 is an example showing execution times for blocks of control programs of respective systems.

The drawing execution control unit 130 may, for example, create divided paths by dividing the movement paths of the respective systems, created by the movement path creation unit 120, and command the drawing unit 140 to perform step execution based on the created divided movement paths. During the step execution, the drawing execution control unit 130 commands the drawing unit 140 to temporarily stop drawing at execution changeover points between the blocks of the respective systems, and commands the drawing unit 140 to resume drawing in response to operator input from the input device 71. FIG. 3 shows an example of the predicted execution times for the blocks of the control programs 200 of the respective systems, predicted by the execution time prediction unit 100. The drawing execution control unit 130 sets a time at which execution of the control programs 200 is started as a reference time to, for example. Then, on the basis of the predicted execution times stored in the execution time storage unit 210, the drawing execution control unit 130 calculates the execution changeover times between the blocks during execution of the control programs 200 of the respective systems as division times. In FIG. 3, for example, a division time $t_3$ at which execution ends in an N202 block and execution begins in an N203 block during execution of a control program O2000 of system 2 is calculated as 2.0 seconds, a division time $t_4$ at which execution ends in the N203 block and execution begins in an N204 block is calculated as 2.5 seconds, a division time $t_5$ at which execution ends in an N102 block and execution begins in an N103 block during execution of a control program O1000 of system 1 is calculated as 3.0 seconds, and so on. The drawing execution control unit 130 creates data relating to the divided paths acquired by dividing the respective movement paths according to the division times on the basis of the movement path-related data stored in the movement path storage unit 220. For example, in the example of FIG. 3, the drawing execution control unit 130 creates three divided paths by dividing the movement path created from the N102 block of the control program O1000 of system 1 at points corresponding to the division time $t_3$, the division time $t_4$, and the division time $t_5$. The drawing execution control unit 130 may create the divided paths by dividing the movement path according to time, or may create divided paths divided in consideration of the acceleration/deceleration of the movement path. In a case where the movement path is simply divided by time, divided paths are created by dividing the distance of the movement path in the N102 block, for example, into $(t_3-t_2):(t_4-t_3):(t_5-t_4)$. Note that movement paths relating to blocks not having any division times in the execution periods thereof (in the example of FIG. 3, the blocks N100, N101, N103, N105, N200, N201, N202, and N203) are handled as is as divided paths without being divided. The drawing execution control unit 130 then issues a command to the drawing unit 140 indicating the divided paths and the times required to execute the divided paths, thereby causing the drawing unit 140 to perform step execution in relation to the movement paths of the respective movable parts. The drawing execution control unit 130 may either create the divided paths successively or create all of the divided paths in advance.

The drawing execution control unit 130 may also command the drawing unit 140 to draw the movable part of each system at a point (referred to hereafter as a drawing time) at which a predetermined time has elapsed following execution of the control program 200, for example. In this case, the drawing execution control unit 130 calculates the position of the movable part of each system at the relevant drawing time on the basis of the predicted execution times of the blocks, stored in the execution time storage unit 210, and the movement path-related data of each block, stored in the movement path storage unit 220. The drawing execution control unit 130 then commands the drawing unit 140 to execute processing for drawing the movable part of each system in the calculated position. Further, using a similar method to that of a case where divided blocks are created, the drawing execution control unit 130 may divide the executed blocks at the drawing times and calculate the positions of the movable parts of the respective systems at the drawing times.

The drawing unit 140 is realized by having the CPU 11 of the movement path drawing device 1 shown in FIG. 1 execute the system program read from the ROM 12 so that calculation processing is performed by the CPU 11 mainly using the RAM 13 and the nonvolatile memory 14 and output processing is performed using the interface 18. The drawing unit 140 draws (simulates) movement paths on the display device 70 on the basis of commands issued by the drawing execution control unit 130 using the drawing data stored in the drawing data storage unit 230 and the shape data stored in the shape data storage unit 240. Information relating to a coordinate system required to draw the movement paths, and drawing data including a viewpoint position, the multiplying factor of the drawing, the color of each drawn element, and so on are stored in advance in the drawing data storage unit 230. Further, shape data relating to the initial workpiece, the movable parts of the respective systems, and so on are stored in advance in the shape data storage unit 240. The drawing unit 140 creates image data of still images and/or moving images used to draw the movable parts of the respective systems on the basis of a command from the drawing execution control unit 130, and displays the created image data on the display device 70.

With the movement path drawing device 1 according to this embodiment, configured as described above, it is possible to ascertain the operations of movable parts of a plurality of systems and the positional relationship between the movable parts of the respective systems in chronological order. As a result, it possible to check offline, prior to the actual processing, whether the movable parts of the respective systems will interfere with each other and whether the processing order is correct between the systems. With the movement path drawing device 1, the need to use the controller and the machine for these checks is eliminated, and therefore the next program can be checked and corrected while processing by the machine is underway. As a result, an improvement in the availability of the machine can be expected.

Figure 4:
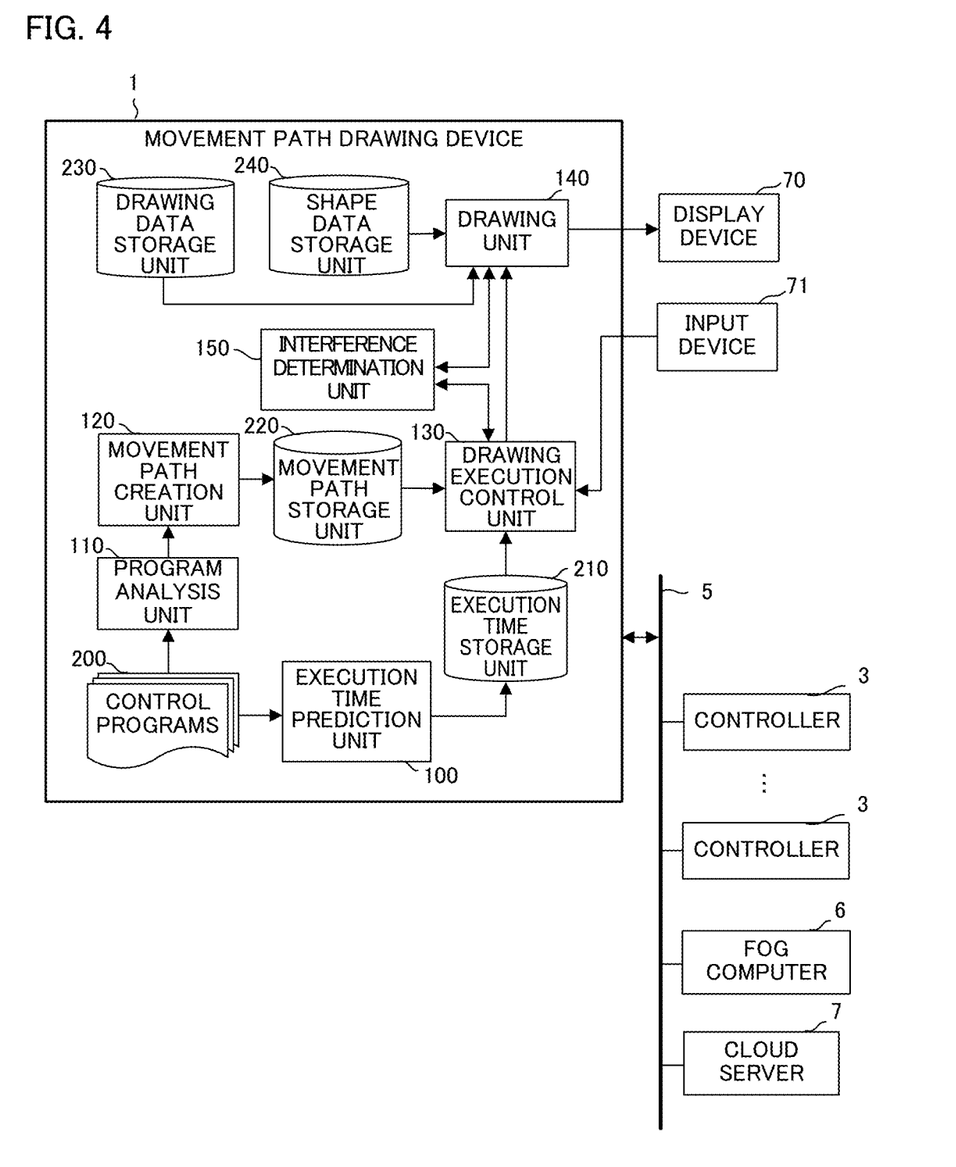
FIG. 4 is a schematic function block diagram of the movement path drawing device according to the first embodiment.

FIG. 4 is a schematic block diagram showing functions included in the movement path drawing device 1 according to a second embodiment of the present invention. The functions included in the movement path drawing device 1 according to this embodiment are realized by having the CPU 11 included in the movement path drawing device 1 shown in FIG. 1 execute the system program so as to control the operations of respective parts of the movement path drawing device 1.

The movement path drawing device 1 according to this embodiment further includes an interference determination unit 150, in addition to the functions included in the movement path drawing device 1 according to the first embodiment.

The interference determination unit 150 is realized by having the CPU 11 of the movement path drawing device 1 shown in FIG. 1 execute the system program read from the ROM 12 so that calculation processing is performed by the CPU 11 mainly using the RAM 13 and the nonvolatile memory 14. The interference determination unit 150 determines whether or not there is a possibility of the movable parts of the respective systems interfering with each other when the movement paths of the movable parts of the respective systems are drawn by the drawing unit 140. The interference determination unit 150 may determine that there is a possibility of the movable parts interfering with each other when, for example, the distance between the movable parts of the respective systems, drawn by the drawing unit 140, falls to within a predetermined threshold set in advance. For example, when the distance between the movable parts of the respective systems, drawn by the drawing unit 140, reaches the predetermined threshold set in advance and the distance between the movable parts varies in a decreasing direction thereafter, the interference determination unit 150 may determine that there is a possibility of the movable parts interfering with each other. Having determined that there is a possibility of the movable parts of the respective systems interfering with each other, the interference determination unit 150 may command the drawing unit 140 to temporarily stop the drawing processing (simulation processing) and display a message indicating the possibility of interference on the display device 70.

With the movement path drawing device 1 according to this embodiment, configured as described above, when, during simulation processing with which it is possible to ascertain the operations of the movable parts of a plurality of systems and the positional relationship between the movable parts of the respective systems in chronological order, there is a possibility of the movable parts interfering with each other, the simulation processing can be temporarily stopped and the operator can be notified.

An embodiment of the present invention was described above, but the present invention is not limited only to the embodiment described above and may be implemented in various forms by adding modifications as appropriate.

For example, the movement path drawing device 1 according to the embodiment described above is configured to include the execution time prediction unit 100, but the execution time prediction unit 100 itself is not an essential feature of the movement path drawing device 1. For example, as long as it is possible to predict the execution times of the blocks of the control programs 200 using an external personal computer or the like, and to acquire data indicating the predicted execution times of the respective blocks via the network 5 or the external device 72, the functions of the movement path drawing device 1 can be utilized. Further, the execution times of the respective blocks do not have to be predicted times. For example, the control programs 200 relating to the respective systems may be executed individually in order to measure the execution times of the blocks, whereupon data indicating the measured execution times may be acquired via the network 5 or the external device 72 and utilized.

The invention claimed is:

1. A movement path drawing device for drawing movement paths of movable parts of a plurality of systems of a machine, the systems being controlled on the basis of control programs for respectively controlling the systems, the movement path drawing device comprising:
a memory that stores execution times for respective blocks of the control programs; and
a processor configured to:
create movement command data by analyzing the control programs;
create the movement paths of the movable parts on the basis of the movement command data;
perform drawing execution control for drawing further movement paths indicating a positional relationship between the movable parts of the plurality of systems at a predetermined time on the basis of the execution times of the respective blocks of the control programs and the movement paths of the movable parts; and
execute drawing processing for drawing the movable parts of the plurality of systems in accordance with the drawing execution control,
wherein the processor is configured to perform the drawing execution control relating to execution of a step of temporarily stopping drawing at a time of an execution changeover between blocks of the control programs, and
wherein the processor is configured to
create divided paths to be used during the execution of the step of temporarily stopping drawing on the basis of the movement paths of the movable parts, and
perform the drawing execution control for drawing the further movement paths indicating the positional relationship between the movable parts of the plurality of systems at the predetermined time on the basis of the execution times of the respective blocks of the control programs and the created divided paths.

2. The movement path drawing device according to claim 1, wherein the processor is configured to perform the drawing execution control for overriding movement speeds of the movable parts.

3. The movement path drawing device according to claim 1, wherein the processor is configured to, in response to a distance between the movable parts of the plurality of systems, drawn by the processor, falling within a predetermined threshold set in advance during the drawing processing, determine that there is a possibility of interference and temporarily stop the drawing processing.

* * * * *